(«12») United States Patent
Ivanovich Orsyk

(10) Patent No.: US 10,343,188 B2
(45) Date of Patent: Jul. 9, 2019

(54) METHOD FOR SEPARATING A GRANULAR MIXTURE IN A FLOWING MEDIUM AND DEVICE FOR CARRYING OUT SAID METHOD

(71) Applicant: ASM TECHNOLOGY SP. Z O O., Lublin (PL)

(72) Inventor: Sergiy Ivanovich Orsyk, Lublin (PL)

(73) Assignee: ASM TECHNOLOGY SP. Z O.O., Lublin (PL)

( * ) Notice: Subject to any disclaimer, the term of this patent is extended or adjusted under 35 U.S.C. 154(b) by 0 days.

(21) Appl. No.: 15/579,602

(22) PCT Filed: Mar. 3, 2016

(86) PCT No.: PCT/UA2016/000030
§ 371 (c)(1),
(2) Date: Dec. 5, 2017

(87) PCT Pub. No.: WO2016/195615
PCT Pub. Date: Dec. 8, 2016

(65) Prior Publication Data
US 2018/0141087 A1  May 24, 2018

(30) Foreign Application Priority Data

Jun. 5, 2015  (UA) .................................. 2015 05268

(51) Int. Cl.
*B07B 4/04* (2006.01)
*B07B 4/02* (2006.01)
(Continued)

(52) U.S. Cl.
CPC .............. *B07B 4/04* (2013.01); *B01D 33/073* (2013.01); *B07B 1/22* (2013.01); *B07B 1/40* (2013.01);
(Continued)

(58) Field of Classification Search
CPC .. B07B 4/02; B07B 4/04; B07B 11/02; B07B 11/04; B07B 11/06; B07B 1/22; B07B 1/40; B07B 7/01; B07B 7/06
(Continued)

(56) References Cited

U.S. PATENT DOCUMENTS 9,061,321 B2 *  6/2015  Kosilov .................... B07B 4/02
9,699,956 B2 *  7/2017  Arnold .................. A01C 7/082
(Continued)

FOREIGN PATENT DOCUMENTS

UA      45881 A     4/2002
UA      96814 C2    12/2012
(Continued)

*Primary Examiner* — Terrell H Matthews
(74) *Attorney, Agent, or Firm* — Andrew Malarz, Esq.

(57) ABSTRACT

The invention is used in various branches of industry, in particular in agriculture for preparing seeds for sowing and for selection purposes. The method of separating a granular mixture in a flowing medium is based on a gravitational supply of particles, with an aerodynamic, monotonously increasing action thereon with a cascade of flat jets, said cascade being stabilized in terms of pressure and discharge. Large impurities are removed from the granular mixture beforehand, and stable parameters are maintained in the separation chamber. The device comprises a vibrating screen, an adjustable hopper with an agitator and a vibrating chute, a generator of a cascade of flat jets, which is connected to a drive for supplying air under pressure, a fraction collector and a separation chamber. The output of the separation chamber is covered with a filtering element in the form of a rotating drum with a calibrating sifter on the surface, said sifter being connected to a cyclone.

8 Claims, 1 Drawing Sheet

(51) Int. Cl.
   *B07B 11/02* (2006.01)
   *B07B 11/06* (2006.01)
   *B07B 9/02* (2006.01)
   *B07B 1/40* (2006.01)
   *B07B 7/01* (2006.01)
   *B07B 7/06* (2006.01)
   *B01D 33/073* (2006.01)
   *B07B 1/22* (2006.01)
   *B07B 7/083* (2006.01)
   *B07B 11/04* (2006.01)
   *B07B 13/16* (2006.01)

(52) U.S. Cl.
   CPC ............... *B07B 4/02* (2013.01); *B07B 7/01* (2013.01); *B07B 7/06* (2013.01); *B07B 9/02* (2013.01); *B07B 11/02* (2013.01); *B07B 11/06* (2013.01); *B07B 7/083* (2013.01); *B07B 11/04* (2013.01); *B07B 13/16* (2013.01)

(58) Field of Classification Search
   USPC .......................................... 209/133, 208, 644
   See application file for complete search history.

(56) References Cited

U.S. PATENT DOCUMENTS 10,131,507 B1 * 11/2018 Doak .................... B65G 53/60
2014/0216991 A1 * 8/2014 Suhin ....................... B07B 4/02
                                                              209/644

FOREIGN PATENT DOCUMENTS

UA                60254 C2        7/2015
WO          2011090452 A1        8/2011

* cited by examiner

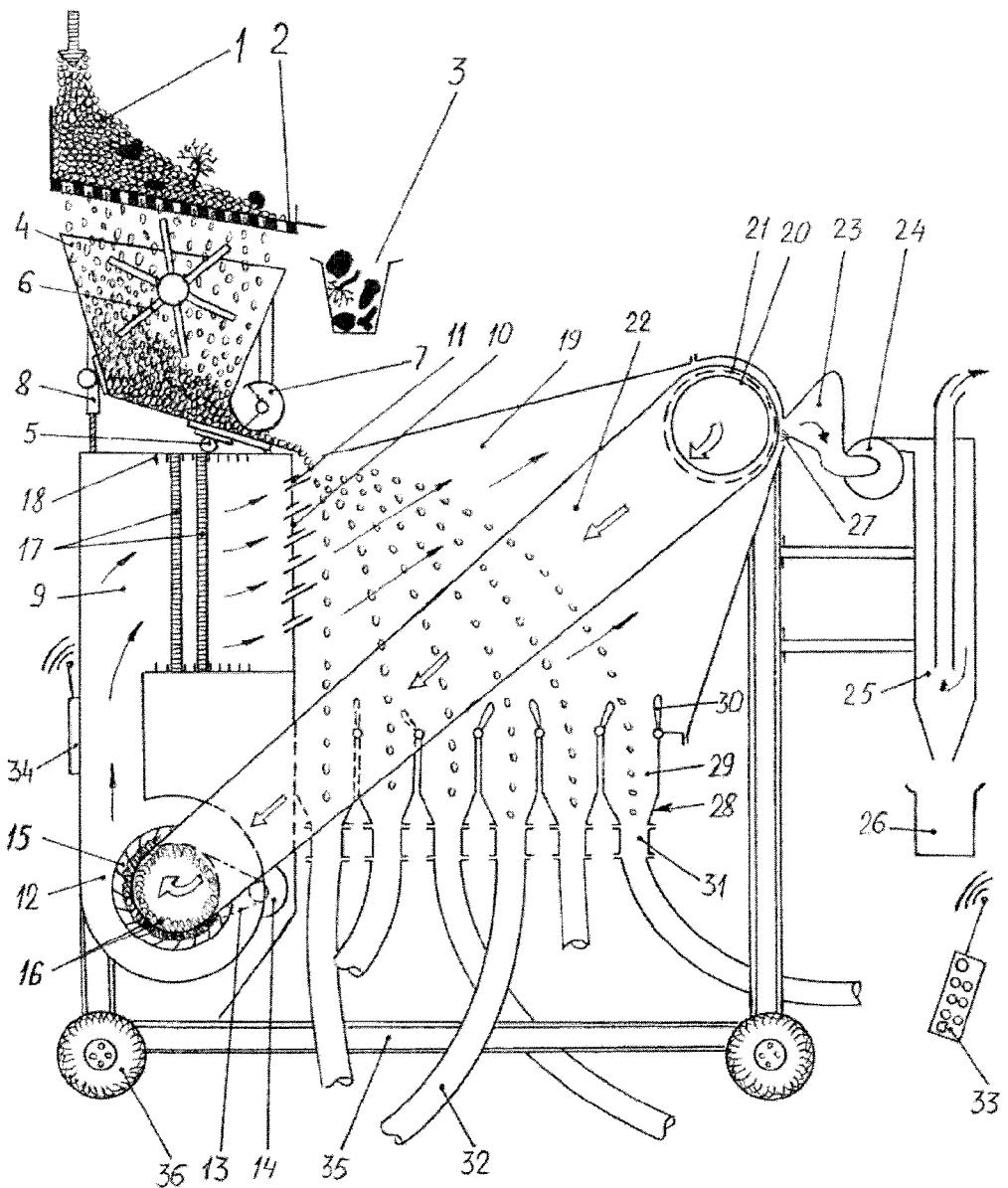

ered on top of each other at an acute angle to the vertical, whose cross-section heights and installation angles increase from top to bottom, and the generator is connected to a source of air supplied under pressure and is covered by side walls. The device also contains a fractions collector, installed under the nozzles [see Patent UA No. 45881 class B07B 4/02 published 15 Apr. 2002 bulletin No. 4, 2002].

METHOD FOR SEPARATING A GRANULAR MIXTURE IN A FLOWING MEDIUM AND DEVICE FOR CARRYING OUT SAID METHOD

TECHNICAL FIELD OF INVENTION

The invention relates to methods and devices for air or liquid separation of granular materials. It can be used in food, chemical and other industries, as well as in agriculture for seed preparation for sowing and for breeding purposes by cleaning, drying (if necessary), and separating the mixture into individual fractions in accordance with the method specification.

BACKGROUND OF THE INVENTION

The known method of separation of granular mixture in a flowing medium consists of gravitational supply of the mixture particles into a separation zone, in an aerodynamic monotonically increasing impact on them at an acute angle to the vertical by the cascade of flat air jets and extraction of finished fractions. Such an aerodynamic impact is carried out in the regime of free alternating power scanning with increasing scanning amplitude and scanning angle. The device for carrying out such method of separation of granular mixture comprises a hopper with a vibrating chute, and the installed under it generator of air jets with flat nozzles arranged one under another and at an acute angle to the vertical, whose the height of cross sections and angle of installation, increase top down. At the same time, the generator is connected to a source of air supplied under pressure, and the generator is covered by side walls. The device also contains a fractions collector, installed under the nozzles [see Patent UA No. 45881 class B07B 4/02 published 15 Apr. 2002 bulletin No. 4, 2002].

In this mentioned method the separation of granular mixture into individual fractions occurs due to the difference in the ratio of their weight and the force of aerodynamic drag. This method, thanks to its peculiarities of the action mode of air jets on the particles of the mixture is more accurate and stable over time than the usual passing of the mixture through the continuous flow of air, especially when the separation of particles of irregular shape takes place. This has become possible due to the fact that the effect of the flow of the cascade of air stream jets allow multiple and different ways of impact, practically at every particle of the free-flowing granular mixture.

However, despite the advantages, this method of separation of the free-flowing granular mixture and the device for its realization have some significant drawbacks. Alternating and free mode of expiration of the cascade of air jets inevitably leads to a periodic and unstable in time and space formation in the cascade jets pressure and separation zones with occurrence of the direct and reverse currents. In the zone of reverse currents the particles of the mixture are drawn (especially light) into the motion, which is opposite to the main stream of air, that leads to a partial mixing of the already separated material with a still non separated material. The instability of this phenomenon in time, as result, leads to the opening (rupture) of the cascade of air jets in any random place, that further enhances the reverse air flow in this area and, as a consequence, intensifies mixing of the separated material with a non separated material. In addition, the opening of the cascade of the air jets contributes to the disruption of generation (cessation of the oscillatory process), that significantly reduces the quality of the separation process, and brings it closer to the quality of separation by the ordinary blowing. The mentioned disadvantages of the known method of separation are due to the imperfect construction of the device, in particular, the construction of its air jets generator.

These drawbacks are partially eliminated in other technical solutions, for example, in the described below method of separation of granular mixtures and in the device for its implementation, the essence of which consists in the following.

The method of separation of granular mixture in a flowing medium, consists of gravitational feeding of the mixture particles in a separation zone, of the aerodynamic monotonically increasing impact on the particles at the acute angle to the vertical by a cascade of flat jets, and of the extraction of finished fractions, with the aerodynamic effect being carried out in the mode of self-oscillatory motion of each jet and the entire cascade of jets at the frequency of the first harmonic of the oscillations.

The device for realizing this method of separation of granular mixture in a flowing medium contains a hopper with a vibrating chute, an air jet generator installed underneath of them, with flat nozzles located one under another and at an acute angle to the vertical, the height of the cross sections of which, the step and the installation angle of which increase from top to bottom, and the generator is connected to a source of air supplied under pressure and surrounded by sidewalls to prevent air from sucking from the environment. The device also contains a separation chamber, under which a collector of fractions is mounted, as well as each pair of adjacent nozzles is equipped with a resonance chamber, that is connected with the space between the nozzles. Resonance cameras, in turn, are equipped with a device to regulate their volume, and the ratio of the height of the nozzles' cross section to the step of their installation is in the range of 0.2-0.25, and the ratio of the extreme upper and extreme lower corners of nozzle installation is 0.65-0.75 [see Ukrainian Pat. No. 60254 for classes B07B 4/02, A01F 12/44, published Jul. 15, 2005, in the Bulletin No. 7, in 2005].

The main disadvantage of the known method of separation of the granular mixture is that it is performed using an open flowing supply system for the separation process, in particular, air stream. In the known method the air stream is sucked into the generator of the cascade jets from the environment, and then it returns to the environment after using it for separation of the free-flowing granular mixtures, however, the "exhausted" air stream returns already saturated with the ordinary dust and volatile impurities of biological origin, that automatically generates a number of additional adverse effects of the known method of separation, namely:

worsening of workers health, by causing contamination of lungs, contribution to unwanted allergic reactions (medical effect), pollution of the environment and the room in which the working device is operating (ecological effect). Thus, despite the acceptable quality of the separation process, the commercial attractiveness of the known method of separation is reduced due to the constant presence of a dense dust cloud in the operating area of the device (economic effect). It can even ignite fires that often leads to the destruction of premises, equipment and casualties among the workers due to explosion of the air-dust mixture when it reaches the critical concentration in the room. And this, in turn, forces to equip the room with a powerful ventilation system what increases the cost of the finished (separated) grain products, due to increase of the total cost of technological equipment and of energy consumption associated with this method of separation.

All mentioned disadvantages of the known method of separation of granular mixture in a flowing medium take place due to the structural imperfection of the device, with the help of which the method is implemented. In the construction of the device the node filter that cleans the air stream coming from the separation chamber from impurities and dust, forming a dangerous air-dust cloud near the device during its operation, does not exist.

However, equipping a conventional device with the node filter of any known construction automatically increases the energy consumption of the separation method, due to the corresponding increase the power of the supply drive to the generator, because such a filter element, according to its density, creates a tangible aerodynamic resistance to air stream. For this reason, equipping the known device with the node filter is non-acceptable solution of the problem of cleaning the exhausted air from the point of economic and energy indicators.

The closest in its essence and achievable effect, taken as a prototype, is a method of separation of granular mixture in a flowing medium, which is based on providing gravitational supply of the mixture's particles to a separation zone, on aerodynamic monotonously increasing impact of a cascade of flat jets on granular mixture at an acute angle to the vertical and on the extraction of the finished fractions, the lightest, solid and volatile fractions of impurities, calibrated by their size into two independent fractions, and the smallest of them, along with the major part of air stream already used for the separation returned to the drive of supplying air to the generator, in which the indicated minor fractions of solid impurities are given acceleration for the mechanical impact with the separated pieces of material, and also, the second impenetrable larger fractions of volatile impurities, with the dust and the remaining exhaust stream of air are continuously removed to the environment.

The device for implementing the above described method of separation of granular mixture in flowing medium, contains a hopper with a vibrating chute, mounted under them generator of cascade of flat jets, with flat nozzles installed in it, one under another, at an acute angle to the vertical, the height of cross sections of which, their step and installation angle, increase from the top to the bottom and which is connected with the drive of air supply under pressure to the generator that is covered by side walls, the separation chamber, under which the fractions collector is located. At the same time the outlet of the separation chamber is covered by the filtering element, made in the form of a rotating drum with a calibrating sieve on its surface, equipped externally with a cleaner of impassable solid impurities outside, wherein the internal area of the rotating drum is connected with the drive, that supplies air under pressure to the generator of the cascade flat jets (reverse path), and the cleaner is made in the form of the consecutively slotted confuser, fan and cyclone with a waste hopper installed so that the filtering element abuts the entrance of the slit of the confuser with a gap, one of the edges of which is provided with a scraper made, for example, in the form of a simple manual brush. As a version of the device, the last chute of a fractions collector that is intended to collect the non-volatile waste of the separation process and a hopper for fugitive waste which gets out from the cyclone, can be combined together into a single structure [see Ukrainian Pat. No. 96814, classes B07B 4/02, A01F 12/44, published on 12 Dec. 2011, in bull. No. 23/2011].

The main disadvantage of the known method of separation of granular mixture in flowing medium is unpredictability of the quality of the process of separation of the mixture into separate fractions. This drawback is due to lack of technical means for alignment of the air stream at the outlet of the actuator which supplies the air under pressure or in front of the generator of the cascade of air jets.

It is known that the air stream at the outlet of the actuator, in this case a centrifugal fan (although the type of the drive does not have any matter), has an excessive turbulence structure with different pressures in the section (the largest in the center of the air stream). Such unbalanced air pressure and air stream is supplied to the nozzles of the generator, and then into the separation zone.

If we use for the separation an unbalanced cascade of air jets, it will be impossible to achieve a uniform aerodynamic action on the particles of the mixture throughout the entire volume of the separation chamber.

Therefore, the separation process is uncontrolled and has fairly low quality, because the different impact of air jets on the mixture automatically sends a certain amount of granular mixture particles to the wrong chutes (trays) of the fraction collector, into which they were supposed to fall with a stable process of separation. The presence of this technological disadvantage is due to the technical (constructional) imperfections of the device—there are no technical tools to equalize the powerful air stream by pressure and laminar flow in the area between the drive of air supply and the air stream cascade generator.

The second significant disadvantage of the known method of separation of granular mixture in flowing medium is the gradual decline of the quality of separated material due to its contamination with mineral dust and small volatile fractions of impurities of biological origin. The presence of this drawback is explained as follows. The only obstacle on the way of volatile impurities is the filtering element.

However, the small volatile impurities and dust, penetrating into it, and on the reverse path coming to the drive and from it, through the generator of the cascade jets, into the zone of separation, are added to the dust and impurities entering the zone of separation with new portions of the mixture to be separated. Therefore, if dust and small volatile impurities pass through the filtering element, then there is nothing to prevent them to pass again through the same filter and pass repeatedly. So over the time, in a closed volume of the separation zone, the total amount of dust and volatile fine impurities will increase. In the end, their mass may exceed the critical point (the maximum permissible level), causing the dust with impurities to fall into a fraction collector, clogging the separated material that dramatically reduces the quality of the material. The presence of this technological disadvantage of known method is associated with technical imperfection of the used device—the device does not have technical tools for periodical removal of excess amounts of dust and volatile contaminants from the closed system of functional units of the device. Besides, the excessive amount of dust and impurities in the closed system of the device can disturb its work, and thus, disrupt the stability of the separation process of granular mixture in the flowing medium, and an excessive amount of dust, is explosive.

The next significant drawback of the known method of separation of the free-flowing granular mixture in the flowing medium is the limited scope of its application which is due to the following (in the example of crop seeds separation). Grains of the granular mixture of cereal crops have certain sizes and weights. In this method, the free-flowing granular mixture, irrespective of its kind, is supplied gravitationally to the separation zone. Moreover, the distance from the edge of vibrating chute to the first jet of air coming out of the upper nozzle of the generator of the cascade of jets, is always the same, due to the immobility of the hopper that is installed above the jets generator.

Therefore, if seeds are supplied to the separation zone, such as poppy seeds grains of which are small in size and weight, or seeds of grass crops (which tends to adhere to each other), they need to have a large kinetic energy of fall, so they can manage to delaminate during the time of free falling (this is possible if the distance between the hopper and the entrance to the separation chamber is sufficiently large). Otherwise, they will just be blown out from the separation zone by the first (upper) air stream, if the capacity of the device increases. If the small seeds are delaminated in a free flight, they are individually separated by cascade of jets into separate factions and fall into appropriate chutes of the fractions collector.

However, if other seeds are fed to the separation zone, such as corn, grains of which are large in size and weight, then they, having a large kinetic energy of falling (if the distance between the hopper and the separation chamber is significant), in the first (upper) air stream (or several upper jets), will just "slip" without separation and will not be completely divided into separate fractions by the rest air streams (the remaining jets do not have time for efficient separation of the grains into fractions because there is no sufficient number of them), and they will get into the chutes of the fractions collector without good separation into their respective fractions. Therefore, for such seeds it is necessary to reduce the kinetic energy of falling, for example, by approaching the hopper to an inlet of the separation chamber. As it was already mentioned, the presence of this shortcoming is due to the immobility of the hopper, that does not allow to adjust the distance between the vibrating chute and the first air jet, in other words, it does not allow to regulate the kinetic energy of the falling grains.

In addition, the device, in particular, its hopper, can not take into account the form of granular mixture (its roughness, humidity, ability to form arches), therefore, it cannot guarantee the stability of feeding of the mixture to the vibrating chute, what is its a significant drawback. Thus, the known method and device for its implementation are not versatile, that limits their technological capabilities.

Another disadvantage of the known method of separation is its inability to ensure continuity of the process of separation of the granular mixture, due to the fact that it is delivered to the hopper without preliminary preparation, that consists of the removal from the mixture the overly large impurities of mineral and biological origin (e.g., rocks, root systems of plants, etc.). If the large mentioned impurities fall into the separation chamber, they can damage the equipment or "drown out" some of his ladders, what will negatively affect the stability of the separation process with an unacceptable decrease of the quality of the final separated product. Consequently, the absence of a device for preliminary preparation of the granular mixture in the process of separation in this device, is its drawback that negatively affects the continuity of the process of separation of the granular mixture.

The fifth disadvantage of the known method of separation of the granular mixture in flowing medium is its insensitivity to changes of conditions from which, on many occasions, the quality of the separation process is dependent. Such conditions may include the abrupt change in the quantity (volume per unit of time) of gravitational feeding of the granular mixture in the separation zone, as well as change of parameters of electrical network, for example, voltage or current frequency. If such deviations occur, the device is unable to respond appropriately since there is no automatic change of the power of the drive that supplies the air to the generator, which is a significant drawback, because while the conditions change, the separation process will still occur according to pre-set parameters, and this will inevitably lead to the worsening of the quality of the separated final products.

The sixth disadvantage of the known method of separation of the granular mixture in the flowing medium is that it does not consider the continuously changing conditions of separation, that is explained as follows. A part of the air stream is removed outside the device, beyond the limits of the device, together with the impurities through the exhaust fan. As a result, not full air stream comes back to the reverse path, and non-static flow of air is found returned to the actuator, not in the state of co-viscous of the same pressure which was involved in the process of separation from the beginning.

Moreover, the lack of air in the reverse path gradually increases, that automatically changes the conditions of flow of the granular mixture. The absence of technical means in the device that compensate for part of the volume of the lost air is its structural disadvantage that affects the quality of the final (screened) product. In addition, in implementation of the known method, sometimes an opposite situation takes place—when the pressure in the separation zone increases and becomes higher than necessary. This situation occurs when the filtering element is clogged so that its capacity for the air returned to the reverse path is diminishes. However, the known method does not provide a means of controlling the pressure in the separation zone, for example, through the periodical automatic relief of excess pressure. Another factor in the destabilization of the separation process is the external, natural or artificial conditions that may occur unpredictably. This is the environment, in particular weather phenomena such as wind, if the device is operated outdoors or drafts—if the device is operated indoors. It is possible to protect the separation process from the influence of these negative phenomena by providing the full protection of the zone of separation from them.

But the most important factor of the noted conditions of separation is that the mentioned changes of separation conditions, can be controlled visually, because the device is made of opaque material that forces to take samples of the separated material constantly and to judge them on their quality against the changed conditions, and if necessary, to change manually the parameters of the separation process.

The seventh disadvantage of the known method of separation of the granular mixture in flowing medium is that the finished (separated) final product is removed to chutes of a fractions collector, preferably where it is reloaded into the container of unstable forms (bags or packages). Firstly, it is not convenient since the separation of the granular mixture into many fractions, the bags should be set close to each other, and in the process of filling them with grains, due to the expansion of such (unstable) type of the packaging, the bags will be adjacent to each other, so they must be somehow "pull" or "pull out" of the device, secondly, it is needed quite often to remove a fraction (or fractions), into a certain area without loading it into containers. The impossibility of withdrawal of the final product to any desired location is the significant disadvantage of the known device, due to the imperfection of the design of its fractions collector.

The eighth disadvantage of the known method of separation of the granular mixture in flowing medium is its limited functional capabilities, for example, this method cannot be applied for drying of cereal seeds. Although it is possible to change the "purge" mode of the granular mixtures to "drying", but such drying will be prevented by some device nodes, specifically, there is no point in the filtering element that creates an obstacle to the free passage of air along the reverse path that also returns the humidified air to the initial position to the generator in the cyclone that in this case is advisable to be replaced by conventional sediment chamber fractions collector, because there is no separation of the granular mixture into the fractions necessary during its drying, while in the construction of the device, there are no tools to control humidity of the air, in terms of which the quality of the finished (dried) product can be evaluated.

The main disadvantage of the device of separation of the granular mixture in a flowing medium, which realizes the above mentioned method, is that its control panel is mounted directly on it. This limits the viewing area of the device by the operator making the job dangerous due to his constant presence near the device.

Another disadvantage of the known device for separation of the granular mixture is that it has a coherent structure that cannot be dissembled into individual units (modules). This shortcoming significantly hampers performance of maintenance work, if it is necessary to replace quickly the individual units, complicates transport to a remote distance, especially large quantities of devices to customers, to complete (create) blocks of device structure that would best meet needs of customers and resolve the necessary technological challenges.

The third disadvantage of the known device is that the actuator of air supply is rigidly connected to the electric motor, which forces it to be near the drive. Of course, this affects negatively the working conditions of the electric motor, because it is located inside the device (no cooling). It also makes difficult to substitute it with another if necessary, but more importantly, if a replaceable electric motor will have a connection unit (shaft) of another size of construction or design than provided for this type of the actuator of air supply (fan), that usually occurs in the use of imported electric motors at the place of foreign customers, so it cannot be managed to connect without any prior changes of construction of the connecting node of the fan (or electric motor), also this change of the connecting nodes is almost impossible to do in nonstationary conditions of the device usage, due to the lack of (in such conditions) necessary equipment, for example, turning, milling, drilling machines. In addition, different customers, often foreign, can have different parameters of the electrical network, for example, voltage, power phase, current frequency than the manufacturer of the devices has. Therefore, the use of external electric motor with a flexible connectivity will allow to connect it to any type of the actuator (fan) of air supply, and it can be replaced quickly into needful, without any design changes of the device units.

A number of disadvantages of the known device is associated with the imperfection of its fractions collector, including rotary shutters, the upper ends of which damages the grain material, sometimes even cut the grains. In addition, nozzles of exit chutes are fixed, that forces rearrangement of the chutes in order to change the direction of the nozzle (direct and inverse fractions) and there are no units of the device that may remove the final product for a certain distance from the device into predetermined area. Another drawback is that the fractions collector is made in the form of chutes, the design of which cannot be changed (except by rotating), for example, by volume. There is no point in such devices when the chutes are used for drying grains.

Another significant disadvantage of the known device is its limited technical capacity to move into a new technological solutions, as well as its design has no means for automatic loading of the granular mixture and discharge (unloading) of finished products, which makes its technically imperfect, since this factor requires additional service, additional labor and technical resources.

The presented critical analysis of the known technical solutions categorically assures that the disadvantages of the know methods of separation of the granular mixture in a flowing medium lies in a causal connection of the structurally deficient parts of the device, with help of which it is carried out.

Solvable Problem

A purpose of the present invention is to remedy the above mentioned disadvantages through a fundamental change in the method of separation of a granular mixture in a flowing medium and to improve the device by expanding their technical and functional capabilities and customer properties, by adding to the separation process new technological operations that will positively influence the quality of the separation process of a mixture into separate fractions, and equip the new device with technical means, in particular, partial construction changes in design of existing nodes in its structure, and introduction of additional nodes that will help to obtain these new properties of the method that will bring the high-quality results of separation or drying of the granular mixture and new capabilities of the device, including expansion of its use.

SUMMARY OF THE INVENTION

The solution of the stated problem is achieved by that the method of separation of a granular mixture into a flowing medium consists of providing gravitational supply of the mixture's particles that are to be separated, separating the granular mixture with an aerodynamic monotonously increasing action of a cascade of flat jets, at a sharp angle to a vertical plane of the cascade, such cascade being stabilized in terms of pressure and discharge, and the output of finished fractions and most of the air flow used for the separation is recycled through the return path to the actuator that supplies air to the generator of the cascade of flat jets, and the impassable fraction of volatile impurities, together with the dust and the remaining air stream is continuously discharged into the environment through a unit, made for example in the form of a cyclone, according to the proposal, before submitting of a granular mixture into the adjustable hopper, the granular mixture is preconditioned by removing there from large impurities of biological and mineral origin during preliminary preparation. A cascade of flat jets for further continuity of the separation process, is formed from the entire air stream pressure, previously equalized, and a laminar continuous flow of air, and from a gravitational supply of blown loose granular mixture falling into a separation chamber, with the optimally required kinetic energy of the fall with simultaneously forced stabilization of the volume of the granular mixture, continuously supplied for the separation, where a power of the flat jets cascade is automatically changed in case of an unexpected change of the quantity or volume of gravitational supply of the granular mixture falling into in the separation zone or changes of parameters of the electric conduit, in particular voltage, frequency and other external factors that affect quality of the separation process, what automatically changes the capacity of the cascade jets, for example, by appropriate adjustment of the operating mode (or power) of the drive, that supplies air to the generator. In addition, the air stream that returns back through the return path is continuously replenished with an additional volume of air in order to compensate the loss of the air flow lost after removing a part of the air stream together with dust into the environment. Besides, in the separation chamber, if necessary, continuously or periodically the excess air is removed in order to maintain the constant flow conditions of the process of separation of granular mixture and the separation zone of the granular mixture is as much as possible protected from the influence of the environment on the separation process, particularly weather and other external conditions—rain, wind, drafts, and etc. In addition, the entire separation process—from the loading of the running, loose granular mixture to the discharge of the finished fractions—if necessary, can be controlled visually, and finished fractions can be removed and move away to any distance from the fractions collector to the desired location, provided by the technological tasks.

The given task is achieved in that the device for separation of granular mixture in a flowing medium contains a control panel, a charging hopper with a vibrating chute mounted beneath the generator of cascade of flat jets located under each other at an acute angle to the vertical plane nozzles, and which is connected with the drive of air supply under pressure, and also covered with the side walls, the fractions collector, made in the form of a frame with a set of sliding out chutes for the removal of direct and inverse fractions, above the side walls of which the rotary shutters of separation chamber are located, the output of which is covered by a filtering element, made in the form of a rotating drum with a calibrating sifter on its surface, and connected with a cleaner on the outside, and the rotating drum with inside cavity equipped with the return path that connects the rotating drum with a drive supplying air into the generator of cascade of flat jets, and also the cleaner of the calibrating sifter is made in the form of a slotted confuser with a taken out ventilator and the device for output of impurities into the environment, made, for example, in the form of a cyclone with a waste adjustable hopper, located so that the filtering element is adjacent to a slit of a confuser with a gap, which one of the edges is equipped with a cleaning element, according to the proposal, above the hopper a mechanical means for preliminary preparation of the granular mixture is situated, which is made in the form of inclined vibrating chute of flat or cylindrical structure through which the loose mixture falls into the hopper, and between the actuator and the generator of cascade of flat jets the technical means is installed to straighten air stream pressure and laminar flow along the path made in the form of one or more sliding bars, and the loading hopper is installed having ability for regulation of its own height relatively to the top nozzle of the jets generator, and with ability of changing the angle of inclination, besides, the hopper has a rotary agitator to break down holdups of the mixture and a hemispherical shutter to regulate amount of the supplied mixture to the vibrating chute, in addition, the rotary shutters of fraction sets are equipped with an aerodynamic profile made of an elastic or other material with the upper ends of the streamline shape or a non resilient covering of a fleece woven/non-woven material, in the form of cilia, brushes, etc., which is the technical means for damping the kinetic energy of the falling particles of granular mixture colliding with edges of the rotary shutters to avoid damage to, deformation and fracture of separated flowing particles of the loose, and the output chute holes of a fraction chutes are installed with the possibility of turning them to an any angle to allow the separated material be removed in any desired location and/or pipes are mechanically connected to the sleeves, product pipe line of required length, for the possibility of removal of finished fractions at a certain distance from the device, which are attached to the branch pipes by means of flanges or other fastening elements, moreover, the control panel of the device is made portable or remote, and the device itself is a self-contained modular with the possibility of disassembling it into separate blocks for ease of preventive maintenance, fast replacement of the individual blocks, and if necessary, ease in transportation, particularly of large batches of devices to the customers and the drive of air supply to the generator is made in the form of a centrifugal or other type of a fan, for example, of the impeller, with the electric motor, kinematically connected with the working member of the fan by means of a flexible transmission, for example, in the form of a belt, moreover, the drive air supply is provided with a valve to regulate the flow volume of air delivered into the transmission, as well as the autoregulation mode of operation of the device is performed with the help of a frequency regulator or other similar technical tool.

In addition, in the method of separation of granular mixture in a flowing medium when the method is applied for drying of granular mixtures, according to the proposal, the maximum possible aerodynamic capacity of the cascade of flat jets is applied, and the dried granular mixture is collected in one place (without separation into fractions), and, if necessary, as determined by the moisture characteristics of air at the outlet of the separation chamber, the dried granular mixture is redirected to the original position for gravity feed for repeated action on the granular mixture by the cascade of powerful air jets (final drying), besides, during drying, the exhaust moist air from the separation chamber is discharged directly into the environment without returning the air into the drive through the return path.

As the possible embodiment option, the drying of the granular mixture, is carried out by heated and dried air which is sucked into the drive from the external environment in summer, during a warm weather, or is positively heated with a heater installed before an inlet of the actuator (the heater can be mounted in any convenient place), and in the presence of return path the moist air is returned through the air heater to the actuator that adsorbs the excess of the moisture, or the air dries from a return path by sublimation (freezing of moisture), or condensation of the moisture from the air stream for which purpose the appropriate technical means are installed in the device, for example, the sublimator or air conditioner.

In addition, in the device for separation of granular mixture in a flowing medium, depending on the type and the condition of granular mixture and on the separation tasks, according to the proposal, the flat nozzles of the generator of cascade of flat jets can be formed by parallel plates of the same or different widths or profiles, for example, by corners, or in the way of other mechanical means that permit to create a longitudinal slits in the generator and the generator itself is made extendable for the possibility of rapid change of one construction to another and the separation chamber is maximum isolated from an ingress of the natural environment factors into it, that can have a negative influence on the separation process and on the environment.

In addition, when the device for separation of the granular mixture in a flowing medium is used as a dryer, according to the proposal, the output from the separation chamber is made open, without a filtering element in order to ensure free existence of moistened air into the environment and, in addition, in this case, the device operates without bars that minimizes the resistance of the passage of air from the actuator to the generator of the cascade jets, and moisture control of the exhaust air is carried out by appropriate technical means (like a hygrometer), on parameters of which the degree of the dried (ready) free-flowing granular mixture is being assessed and before an entrance to the drive the air heater is mounted for forceful heating air sucked either from the environment or from the reverse path, in case such exists in the construction of the device. The entrance to the drive air supply may be equipped with a sublimator or an air conditioner for dehydration of air.

In addition, the device for separation of the granular mixture in a flowing medium, according to the proposal, can be placed on a chassis with driven or not driven swiveled wheels to allow the maneuvering of the device without the involvement of additional vehicles in the operating position, like in warehouses, grain elevators and during transportation to a new location, and also can be equipped with an automatic loading hopper of the granular mixture, for example, in the form of an auger or bucket lifts and the device is capable of an automatic discharge of the separated or dried material (finished product) to the desired location.

In addition, in the device for separation of the granular mixture in a flowing medium, according to the proposal, the collector of fractions is made in the form of a solid body with movable inside (movable or removable) partitions, dividing uniformly or non-uniformly the internal part of the body into the chutes for collecting the direct, the forward and return fractions, and the chutes can be made of transparent or opaque woven fabric or polymeric material and can have a valve for allowing sampling fractions and the chutes can have an unstable form and minimum height that is sufficient only to mount them to the frame of the collector of fractions for a possibility of the visual control of the separation or drying process, one of the lateral external surfaces of the entire device or individual units is made of a transparent material, including trays and reverse path.

Furthermore, in the device for separation of the granular mixture in a flowing medium, to enable possibility of the visual control of the process of separation or drying according to the proposal, one of the lateral external surfaces of the entire device or its individual units is made of a transparent material, including the chutes and the return path.

A distinctive feature of the proposed method of separation of granular mixture in a flowing medium is that due to the out-of-hay corresponding technological operations there is a real opportunity to fully stabilize and automatically adjust all the parameters and the time and also irrespective of any internal and external factors, the whole process of separating a mixture into individual fractions or drying of granular material by a heated and dried aerodynamic flow of the air.

A distinctive feature of the device for the separation of granular mixture in a flowing medium is that due to design changes it has become a multifunctional, the scope of its application is expanded, it becomes convenient in servicing and in transporting, it allows full control of the process of separation and drying at any stages, and most important is that it can automatically responds to any changes in the network environment, the raw material, quickly changes in accordance with the technological challenges impact on the loose granular mixture.

The technical result of the invention is to provide a new process of qualitative separation or drying of the grain material (granular mixture) due to the stabilization in time of exposure on the mixture of air stream at all indicators on which the device automatically responds due to the introduction of relevant structural changes in it, as well as the convenience and security of service and the redeployment of the device, without pollution of the environment. The quality of separation of granular mixture at multifractional aerodynamic separation by weight, density or specific gravity has not only worsened, but, on the contrary, increased.

Therefore, a change of the principle of separation of granular mixture in a stable cascade of air jets, protected from the exposure on them by artificial and natural factors, entails a corresponding increase of technical and operational features and the customer's properties of the device.

Thus, all the essential features inherent in the proposed technical solution, obtained due to the introduction of appropriate technological and structural changes in the process and the device, achieve a positive technical result that is stated in the object of the invention.

BRIEF DESCRIPTION OF THE DRAWINGS

Further essence of the proposed technical solutions is explained with the illustrative material, which shows drawings of the proposed device for carrying out the mentioned method of separation of granular mixture in a flowing medium, a side view with a partial section for better demonstrating of the construction and the separation process. The single arrows indicate the air stream in the device, double arrows—return of the part of air stream to the generator to reform the cascade of flat jets for separation.

DETAILED DESCRIPTION OF EMBODIMENT

The proposed device for separation of granular mixture 1 in a flowing medium includes a loading unit that consists of a mechanical means for the prior preparation of the granular mixture 1, that is made, for example, in the form of inclined vibrating screen 2 of a flat structure (for this purpose can be used another construction of similar usage, for example, vibrating tables, rotating screens of a drum type). This mechanical tool enables to withdraw from the granular mixture 1 a large impurities of mineral and biological origin and to send it into a specially designed container 3. Under the vibrating screen 2 the hopper 4 is installed with vibrating chute 5 for gravitational feeding of granular mixture 1 into the separation zone. In the hopper 4 the rotating agitator 6 is mounted, that is intended for the destruction of grain vaults in the hopper 4. The amount of output granular mixture 1 from the hopper 4 on the vibrating chute 5 is regulated by a hemispherical shutter 7. The hopper 4 is installed with the possibility of adjusting its height and an angle of inclination with a simple screw mechanism 8 (the mechanism is given as an example, other ones can also be used for this purpose, such as pantograph, the "Nurembergal scissors", etc). The described loading unit of the proposed device is located on the vertical column 9.

In column 9 a retractable generator 10 of cascade jets is integrated, as a closed contour volume with a set of a number of flat nozzles 11 for forming a cascade of flat air jets and which are located one under another and at an acute angle to the vertical. The height of cross sections of the nozzles 11, their step and their angle of installation are increasing from top to bottom. In the case of technological necessity, the type and condition of granular mixture 1, the jet generator 10, as a whole, or its nozzle 11 can have another construction, for which the generator is made extendable for the efficiency of replacement it into the necessary part. The jet generator 10 is aerodynamically controlled with the actuator 12 (e.g. with centrifugal fan), that feeds an air stream under the pressure and is kinematically connected (e.g. with a belt transmission 13) with electric motor 14, that sets it in action. In front of the actuator 12 the flap 15 is mounted (made of, for example, in the form of a diaphragm or of another design—it does not matter) for the regulation of the air volume, flowing into the actuator 12, as well as at the entrance of the actuator 12, the radiator 16 is located for heating and drying of humid air. This is necessary in case when the device is used as a dryer in order to accelerate and improve the efficiency of the drying process of the grains. If you are using another principle of the dehydration of the air stream that is for drying of the granular mixture 1, before entering into the actuator 12, the air stream supply can be disposed to the sublimator or air conditioner (not shown because of common knowledge). These technical means of heating and dehydration of the air stream can be installed at any other convenient place.

Between the actuator 12 and the generator 10 of a cascade of flat jets, the technical means is arranged to align the air stream according to the pressure and laminar expiration in a cross-section, made in the form of one or more retractable grids 17, the spatial orientation of which in relation to the generator 10 can be changed by their changes in the corresponding slots 18. By the generator 10 from the nozzles 11 the separation chamber 19 is adjacent, which represents a closed volume formed by the side and top walls. At the end of the separation chamber 19, that is on the opposite side from the jet generator 10, a filter element having a form of a rotating cylindrical drum 20 with a calibration sieve 21 (directly the filter) on its cylindrical surface is arranged. The drum 20 at one end is kinematically connected with the rotation drive (not shown because of common knowledge). The second end of the drum 20 is open and adjoin to duct 22 the opposite end of which is adjacent to the drive 12 in order to supply air under pressure to the jet generator 10. The purifier of the air stream from the impassable fractions through the calibration sieve 21 of the impurities is made in the form of successively arranged slit 23, the air suction fan 24, and the cyclone 25 with a hopper 26 for collecting the products of cleaning of the air stream. The slit of the confuser 23 is adjacent to the clearance gauge directly to the calibration sieve 21 of the rotating drum 20. One of the edges (no matter which one) of the slit 23 is provided with a scraper 27 that is made, for example, in the form of a conventional manual brush with the bristles.

Under the separation chamber 19, a fraction collector 28 with trays 29, for collection of direct and returned fractions of the separated material, is situated. After the trays 29 returned fractions occur the lacking volume of air from the environment is sucked in order to compensate the lost air during abstraction of the impurities with help of the slit 23 with the air suction fan 24. The rotary shutter 30 of the fraction collector 28 has an aerodynamic profile and are made of an elastic material with the streamline shape of the upper ends or are covered with a non-elastic plating or with a brushed woven/nonwoven material, in the form of cilia, brushes, etc., that is technical means for damping the kinetic energy of the falling particles of the granular mixture 1 that faces ends of the rotary shutters 30, in order to prevent the injury, deformation and destruction of the separated particles of the granular mixture 1. The shutters 30 may also have a straight or another shape profile, and can be made of metal, wood, etc., if there is a technological need. The nozzles 31 of the outlets of the trays 29 of a fraction collector 28, are installed with the possibility of rotation at any angle that is with the possibility of rotation around its axis. For possibility of exhaust of the separated (finished) material in any desired zone, the nozzles 31 are mechanically connected to the sleeves 32 (units to assign the products) of necessary length in order to allow extraction of the finished fractions at a certain distance from the device, which are connected to the nozzles 31 by flanges or other fastening means. The control panel 33 of the device is made portable or remote, and is connected electromagnatically with the control unit 34 of the device and it is fixed on the column 9, for example.

The device, in general, is made module with the possibility of dismantling it into separate blocks for the convenience of preventive maintenance, for fast replacement of individual units, if necessary, and for easy transportation, particularly of large batches of devices to the customers. The device is mounted on a frame 35, which if necessary, can be installed on a chassis with a driven or non-driven rotatable wheels 36, for the possibility of easy maneuvering of the unit, without involving additional vehicles while changing the operating position, for example, in warehouses, at grain elevators and during the transportation to a new location. However, the wheels 36 is not a mandatory node device. In some cases, for example, when the device is installed in a stationary production line, it just simply leans on the frame, so the wheels in this case are not necessary. The device, if necessary, can be equipped with a hoper automatic loading means of a granular mixture 1, for example, a screw or a bucket lift and with an automatic discharger of the separated or dried material (finished products) in the necessary zone (not shown because of common knowledge).

The proposed method of separation of the granular mixture in a flowing medium, with the help of the proposed device, operates as follows (for example the separation of the grain material).

Before the usage, the device is set up (usually it is done by the manufacturer) according to the kind of granular mixture 1, the mode of air supply to the generator 10, the height and the angle of rotation of the hopper is determined, then the grids 17 are installed in the desired position (stabilizers of the air stream), a set of generators 10 with a variety of nozzles 11 is prepared (according to the type and condition of the granular mixture 1, different designs of nozzles 11 are used that affects performance of the device and the power of the drive 12 for energy optimization of the device), and others. These device settings are carried out in advance for various kinds of granular materials and these settings of parameters are passed to the consumer together with a set of required generators 10 and with the supporting documentation.

The grain material (granular mixture 1) is served as a continuous stream on the inclined vibrating screen 2, where it is separated from the large impurities of mineral and vegetable origin. These impurities are removed in the intended for them container 3, and the purified grain material passes (awakens) through oblique openings of the inclined vibrating screen 2 and get into the hopper 4 and the vibrating chute 5, in which the agitator 6 destroys the grain vaults in event of their occurrence and they move the inclined bottom up responses to the output hopper 4. The amount of the grain material that gets into the vibrating chute 5 is regulated by a hemispherical shutter 7. Next comes the gravitational submission of the granular mixture 1 into the separational chamber 19 from the side of the nozzle 11. On the grains of the granular mixture 1 that are in a free fall and that have a certain kinetic energy of the fall, act flat jets of the generator 10 under an acute angle to the vertical with a cascade of flat jets in their fully developed turbulence that occurs due to distortion by the jets of the generator 10 of the jets, during their expansion in the nozzles 11. At the outlet of the separation chamber 19, laden with dust and mechanical impurities of different shape, the air stream abuts the rotating drum 20, which almost completely covers the output of the separation chamber 19, because it almost equals the width of the chamber. The air stream comes through the calibration sieve 21 into the internal cavity of the rotating drum 20, and the impassable due to the size solid particles remain outside the drum 20, on the surface of the calibrating sieve 21. Thus the calibration of the air current is cleaning of the air stream from the impurities and partially from the dust. After passing the calibration sieve 21 the small impurities fall together with a portion of the air stream inside the rotating drum 20. This part of the air stream together with small impurities enters the air duct 22 and through it returns to the drive 12, almost forcibly by sucking the air from the air duct 22 with the help of the actuator 12. As the drum 20 rotates, its surface (the calibration sieve 21) is continuously cleaned from the failing mechanical impurities with the help of the scraper 27. All waste from the separation process and from the pollution come into the slotted confuser 23, thanks to their suction of the air stream that is created by the air suction fan 24, then they fall into the cyclone 25, where they are separated from the air and then fall into the hopper 26 that is made to collect waste. From the cyclone 25, the cleaned air is returned to the environment with weak power, almost imperceptible stream, and therefore it does not create draughts around the working device.

The returned to the actuator 12 part of the air stream, with a small solid impurities falls on the grids 17, where the air stream is cleaned from impurities, is aligned according the pressure and is transferred into the laminar flowing mode. In this form, the air stream enters the generator 10 of jets and is served into the nozzles 11. During the impact of air jets, the grains of granular mixture 1, are divided into separate fractions and fall into the appropriate for them tray 29 of the fraction collector 28. From the trays 29, the final product is removed by product ducts 32 into the designated area that is selected by the rotation of the nozzles 31 and is defined by the length of the product ducts 32. During the technological breaks, the grids 17 are removed and cleaned of accumulated stains on them, the large impurities from the container 3 is also removed. If there is a need to move the device to a new position, it is autonomously transported on its own wheels 36. If necessary, the generator 10 of the jets can be changed to another one, in accordance with new technological challenges.

In case when the device is used for drying grain material, the filter assembly, the vibrating screen 2, a fractions collector 28 must be removed, because there are not necessary the cyclone 25 may be replaced by a conventional sedimentary chamber that allows to minimize aerodynamic resistance to the movement of air in the separation chamber 19. In this case, the hygrometer is appropriately set, and the mode of drive power 12, and the air supply is changed to the maximum allowable for this type of granular mixture (grain material). The radiator 16 is turned on (if necessary) and so the device is being prepared to be used as an aerodynamic dryer. During the drying of granular mixture 1, the process of impacting of the cascade of jets on the mixture has the similar effects, as at the process of separation.

If one side of all units of the device is made of a transparent material, then it becomes possible to visually observe the whole process of separation (drying), to watch it, and to make timely adjustments. For sampling of the grains material, the respective product ducts 32 can be formed, and the trays 29 can be made of any material, including an unstable form.

A significant difference of the proposed technical solutions from the prior known solutions, lays in a complete stabilization of the process of separation of granular mixture, due to preliminary preparation of the source material, the stabilization according to the pressure, and air stream expiration, in an automatic response to changes in the environment, in possibility of autonomous relocation of the device into the new technological positions, as well as the possibility of withdrawing of the finished product to any desired area, and the use of the process and the device as aerodynamic dryer with heated/not heated dehydrated air. All these differences, allow to qualitatively separate the granular mixture into separate fractions, regardless of any external and internal factors, allow to expand the sphere of the device usage: as for separation, and as for drying, the device is convenient to maintain and relocate it to a new area. None of the known methods of aerodynamic separation and devices for their implementation can have the specified above properties, because they do not contain all the essential features that are inherent in the proposed technical solution.

The proposed technical solutions were tested in practice. The device consists of the conventional parts and components, the method of separation does not contain activities or processes that would be impossible to replicate at the present stage of development of science and technology, particularly, in the field of agricultural engineering, which means, that they are industrially applicable. In the known sources of patent, scientific, technical, and other information, such methods of separation of granular mixture in a flowing medium, as well as devices for their implementation of similar purpose with these great essential features and advantages, are not revealed. Therefore, they meet the criterion of "novelty" and therefore they are considered to be those that can receive legal protection.

Since the set of essential features that are contained in the proposed technical solutions do not arise and can not be found in the existing prior art, the claimed technical solutions are deemed to contain the required "inventive level" which will result in issuance of a patent.

Technical Advantages of the Invention

The technical advantages of the proposed technical solutions in comparison with prior art are the following:
 full stabilization of the separation process (drying) of the granular mixture for all parameters over time due to the lack of influence on the process of external and internal factors;
 preventing possibility of failure of the device or violation of the separation process by the prior preparation of the granular mixture for the separation process;
 stabilization of loading of granular mixture in the separation zone due to the presence of technical means in the form of the hopper for breaking grain domes;
 ability of taking into account the type and physical properties of granular mixture and the kinetic energy regulating its free falling due to the possibility of adjusting the height and the angle of the hopper in the zone of separation;
 stabilization of cascade jets by supplying the generator aligned according to the pressure and expiration of the laminar air stream;

extension of the technical and functional properties of the device due to the possibility of its use, as a separator, and a dryer as dehydrated by heated air and unheated;

convenience control of the device due to the remote or portable control panel;

the ability to stabilize the separation process due to the timely response to changes in the external (weather) environment and air pressure control in the separation chamber, and the execution of the separation zone isolated from the environment;

ease of repairing and preventive maintenance through the use of a block circuit construction scheme of the device;

the improved quality of the separation process and preserve the integrity of the grains due to the fact that the rotary shutters have an aerodynamic profile made of elastic material or are provided with the absorbers of kinetic energy of grains falling on them;

the possibility of removal of the finished product in any desired area due to the fact that the output connections of the trays are made rotatable and are provided with product ducts;

ease of relocation of the device due to the fact that it is mounted on wheels;

ease of service by adding to the device additional technical means of loading and unloading of the finished (separated) product;

no attachment to a particular kind of electrical network due to the fact that the drive and electric motor are connected kinematically by means of a flexible connection, for example, through a belt transmission;

possibility to visually monitor the entire process of separation (drying) of the granular mixture due to the fact that one side of the device is fully or partially made of a transparent material.

The social effect of implementation of the proposed technical solutions, in comparison with prior art devices is obtained by improving the working conditions, ease of maintenance and the transportation of the device, improved quality and increased output of finished products due to the reduction of waste (destroyed and damaged grains).

The economic effect of the implementation of the proposed technical solutions in comparison with prior art devices is obtained by increasing the commercial attractiveness of the device, which will increase the sales, and also by the use of only one device to solve two fundamentally different problems—separation and drying of the granular mixture.

After the description of the proposed method of separation of the granular mixture in a flowing medium and device for its implementation, for specialists in this field should be apparent that all of the above mentioned is merely illustrative and not restrictive since it is being represented by this particular example. The numerous possible modifications of the device, in particular, its structural elements and units, the principles of parameter settings and methods of operation settings, of course can vary, depending on the type and condition of raw materials, external and internal factors, the volume of production, technological problems, etc., and of course, fall within one of the conventional and natural approaches in this field of knowledge and are so considered in such way that are within the volume of the proposed technical solutions. Set of essential features inherent in the proposed technical solutions obtained through introduction of appropriate structural and technological changes allowed to acquire the proposed method of separation and the device for its implementation for carrying out the above mentioned and other benefits. Introduction of any incremental changes and additions to the proposed items of equipment will naturally limit the range of their advantages, and therefore it cannot be considered as new technical solutions in this field of knowledge, because other similar to the described method of aerodynamic separation of granular mixture in a flowing medium and device for its implementation, will not require any creativity from the designers, technologists and engineers, and therefore can not be considered as the results of their creative activities or a new intellectual property, and no appropriate protection by patent letters can be awarded in accordance with applicable patent law.

The invention claimed is:

1. A method for separating a granular mixture in a flowing medium consisting of providing gravitational supply of the mixture's particles, removing large impurities from the granular mixture, separating the granular mixture with an aerodynamic monotonously increasing action of a cascade of flat jets, at a sharp angle to a vertical plane of the cascade, said cascade being stabilized in terms of pressure and discharge, wherein most of the air flow used for separation is recycled through a return path into a drive supplying air to a generator of the cascade of flat jets, discharging continuously an impassable fraction of volatile impurities together with dust and remaining air stream into environment through a unit in the form of a cyclone, wherein the granular mixture supplied in the flowing medium into an adjustable hopper preconditioned by removing therefrom large impurities of biological and mineral origin, creating a cascade of flat jets for further continuity of the separation process, formed from an entire air stream pressure, previously equalized, and a laminar continuous flow of air, and from a gravitational supply of blown loose granular mixture falling into a separation chamber, setting up the cascade to provide required kinetic energy of falling with simultaneously forced stabilization of the granular mixture volume substances volume, and it continuously supplied for separation, changing automatically a power of the flat jets cascade in case of an unexpected change of quantity or volume of gravitational supply of loose mixture into the separation chamber is carried out by means of a vibrating hopper with the ability to adjust the height of the fall and the volume of the mixture, continuously supplied to the separation or a change of electrical parameters of an electrical conduit, particularly, tension, voltage, frequency, by an unexpected change of local electrical power grid parameters particularly voltage or frequency, by appropriate adjustment of operating mode, or power, of the drive supplying air to the generator, by continuous replenishment of air flow returned through the return path with an additional volume of air to compensate for loss of the air flow lost after removing a part of the air together with dust into the environment by removing continuously or periodically an excess of air pressure in the separation chamber in order to maintain constant flow conditions of separation process of granular mixtures, by protecting the separation zone or area of the granular mixture from impact of the environment on the separation process, particularly influence of weather and other environmental conditions like rain, wind, drafts, wherein the entire process of separation—from loading granular mixture to discharging of finished fractions—if necessary, can be controlled visually, and finished fractions can be removed and move away to any distance from a fraction collector to the desired location.

2. A device for separating a granular mixture in a flowing medium, comprising
a control panel,
a generator of a cascade of flat jets, disposed one above the other at an acute angle to the vertical plane nozzles, which is connected to a drive for supplying air under pressure, and covered with side walls,
a charging hopper with a vibrating chute mounted beneath the generator,
a fraction collector made in the form of a frame with sliding out chutes to remove direct and inverse fractions,
rotary shutters located above the side walls,
a separation chamber whose output is covered with a filtering element in the form of a rotating cylindrical drum with a calibrating sifter on a surface, that is connected with a cleaner on the outside wherein
the cleaner of the filtering element is made in the form of a slotted confuser,
with a taken out ventilator and a device for removing impurities into the environment made in the form of a cyclone with a waste adjustable hopper placed in a way that the filtering element is adjacent to a slit of a confuser with a gap, which one of the edges is equipped with a cleaning element,
a rotating drum with inside cavity equipped with a return path, which connects the rotating drum to the drive supplying air to the generator of the cascade of the flat jets,
a mechanical means situated above the hopper which is used for a preliminary preparation of the granular mixture, made in the form of an inclined vibrating screen, with flat or cylindrical structure, through which the loose mixture falls into the hopper,
a technical means located between an actuator and the generator of the cascade of flat jets to straighten air stream pressure and laminar flow along the path, which is made in the form of one or more sliding bars,
a loading hopper, having ability to regulate its own height relatively to a top nozzle of the jets generator, with ability of changing an angle of inclination, wherein
the hopper is equipped with a rotary agitator to break down holdups of the mixture and with a hemispherical shutter to regulate amount of the supplied mixture to the vibrating chute, wherein
the rotary shutters of fraction sets are equipped with an aerodynamic profile made of an elastic or other material with upper ends of streamline shape or a non-resilient covering of a fleece woven/nonwoven material, in the form of lashes, brushes, and others which is a technical means for damping kinetic energy of falling particles of the mixture, wherein
the particles collide with edges of the rotary shutters to avoid damage to, deformation and fracture of separated flowing particles of the loose mixture, wherein
output tray holes of fraction chutes are installed being capable of turning to any angle, to allow the separated material be removed in any desired location and/or pipes are mechanically connected with sleeves, a product pipe line of the required length, for a possibility of removal of finished fractions at a certain distance from the device, wherein
the sleeves are connected to branch pipes by means of flanges or other fastening elements, wherein
the control panel of the device is portable, and the device is a self-contained modular with a possibility of dismantling into separate blocks for ease of preventive maintenance, fast replacement of individual blocks, and, if necessary, transportation, especially of large batches of devices to customers, wherein
the drive air supply to the generator is made in the form of a centrifugal or other type of a fan, like an impeller, with an electric motor, kinematically connected with a working member of the fan by means of a flexible transmission in the form of a belt, and the drive air supply is provided with a valve for regulation of flow volume of air delivered into the transmission, wherein
the auto-regulation mode is performed with a help of a frequency regulator or other similar technical tool.

3. The method according to claim 1, characterized in that when the method is applied to dry granular mixtures, a maximum possible aerodynamic capacity of the cascade of flat jets is applied, and the dried granular mixture is collected in one place, without separation into fractions, wherein
if necessary, as determined by moisture characteristics of air at an outlet of the separation chamber, the dried granular mixture is re-directed to the original position for gravity feed to repeat an action on the granular mixture by the cascade of the powerful air jets wherein, during drying, exhaust moist air from the separation chamber is discharged directly into the environment without returning the air into the drive through the return path, wherein
the drying, if necessary, is carried out by heated under dried air, which is sucked into the drive from the environment in the summer during a warm weather, or is positively heated by a heater installed before an inlet of an actuator or in any convenient place, wherein
in the presence of the return path, the moistened air is returned through the return path to the drive, passing through the air heater, absorbing excess of moisture therefrom, or drying air from the return path by sublimation—moisture freezing—or by condensation of moisture from the air stream for which purpose appropriate technical means, like a sublimator or a positioner, are incorporated into the device.

4. The device according to claim 2, characterized in that depending on type and condition of the granular mixture, and on separation tasks, the flat nozzles of the generator of the cascade of flat jets can be formed of parallel plates of the same or different widths or profiles, like corners, or in the way of other mechanical means permitting to create a longitudinal slits in the generator, wherein
the generator is made extendable for a possibility of rapid change of one construction to another, wherein
the separation chamber is maximally isolated from an ingress of natural environmental factors, which can have a negative influence on the separation process and the environment.

5. The device according to claim 2, is characterized in that when using the device as a dryer, moisture control of exhaust air is carried out by a technical means, like a hygrometer, on parameters of which a degree of the dried, ready free-flowing mixture is assessed, wherein
before an entrance to the drive an air heater is mounted for forceful heating air sucked either from the environment or from the return path, if such exists in construction of the device wherein an entrance to the drive air supply may be equipped with a sublimator or an air conditioner for dehydration of air.

6. The device according to claim 2, characterized in that the device can be placed on a chassis with driven steering wheels to allow maneuvering of the device without involvement of additional vehicles in the operating position-like in warehouses, grain elevators and during transportation to a new location, wherein the device can be equipped with an automatic loading hopper of the granular mixture in the form of an auger or bucket lift, wherein the device is capable of automatic discharge of the separated or dried material as a finished product, to the desired location.

7. The device according to claim 2, characterized in that the trays of collection of fractions are made of a transparent or an opaque fabric or a polymeric material, wherein the trays of collection have a valve to allow sampling fractions, and trays of an unstable form may have a minimum height sufficient only to mount the trays to a frame of the collection of fractions.

8. The device according to claim 2, characterized in that for a possibility of the visual control of the separation or drying process, one of the lateral external surfaces of the entire device or individual units is made of a transparent material, including trays and the return path.

\* \* \* \* \*